United States Patent [19]

Hausman et al.

[11] Patent Number: 4,521,561
[45] Date of Patent: Jun. 4, 1985

[54] VINYL ACETATE/ETHYLENE COPOLYMER EMULSIONS EXHIBITING BOTH PARTIALLY- AND FULLY-HYDROLYZED POLYVINYL ALCOHOL COMPATIBILITY

[75] Inventors: Mary L. Hausman, Barto; William E. Lenney, Allentown, both of Pa.

[73] Assignee: Air Products and Chemicals, Inc., Allentown, Pa.

[21] Appl. No.: 584,589

[22] Filed: Feb. 29, 1984

[51] Int. Cl.$^3$ .............. C08F 2/30; C08F 18/08; C08L 31/04
[52] U.S. Cl. .................. 524/459; 524/503; 524/297
[58] Field of Search .......... 524/459, 503; 526/202

[56] References Cited

U.S. PATENT DOCUMENTS

| | | | |
|---|---|---|---|
| 3,661,696 | 5/1972 | Knutson | 524/459 |
| 3,734,819 | 5/1973 | Knutson | 524/459 |
| 3,769,151 | 10/1973 | Knutson | 524/459 |
| 3,827,996 | 8/1974 | Beresniewicz | 260/29.6 |
| 4,043,961 | 8/1977 | Beresniewicz | 524/503 |
| 4,118,357 | 10/1978 | Brabetz | 524/459 |
| 4,133,791 | 1/1979 | Kemenater | 524/459 |

*Primary Examiner*—C. Warren Ivy
*Attorney, Agent, or Firm*—Michael Leach; James C. Simmons; E. Eugene Innis

[57] ABSTRACT

A vinyl acetate/ethylene copolymer emulsion exhibiting both partially- and fully-hydrolyzed polyvinyl alcohol compatibility which comprises an aqueous colloidal dispersion of a copolymer prepared by the emulsion polymerization of vinyl acetate and ethylene in the presence of a polyvinyl alcohol stabilizing system having an 8 to 10 mole % residual vinyl acetate content, especially comprising a mixture of a polyvinyl alcohol having a 3 to 6 mole % vinyl acetate content and a polyvinyl alcohol having a 10 to 14 mole % vinyl acetate content in a ratio that yields an average residual vinyl acetate content of 8 to 10 mole %. When blended with a partially- or fully-hydrolyzed polyvinyl alcohol to provided an adhesive composition, such compositions demonstrate an enhanced plasticizer thickening.

13 Claims, No Drawings

VINYL ACETATE/ETHYLENE COPOLYMER EMULSIONS EXHIBITING BOTH PARTIALLY- AND FULLY-HYDROLYZED POLYVINYL ALCOHOL COMPATIBILITY

TECHNICAL FIELD

The invention relates to vinyl acetate/ethylene resin emulsions and, more particularly, relates to such copolymer emulsions blended with polyvinyl alcohol to provide an adhesive composition.

BACKGROUND OF THE INVENTION

In the adhesive industry formulators typically blend either partially-hydrolyzed polyvinyl alcohol or fully-hydrolyzed polyvinyl alcohol with vinyl acetate/ethylene copolymer emulsions to obtain adhesive compositions having varying properties. When blended with a fully-hydrolyzed polyvinyl alcohol, a water resistant adhesive suitable for making cardboard packaging is obtained. When blended with a partially-hydrolyzed polyvinyl alcohol, the water sensitive adhesive product is suitable as the moistenable adhesive on envelop flaps. Prior to the present invention there was no single vinyl acetate/ethylene emulsion product which was compatible with both partially-hydrolyzed and fully-hydrolyzed polyvinyl alcohols and also afforded an emulsion-polyvinyl alcohol blend having enhanced plasticizer thickening.

U.S. Pat. No. 3,827,996 discloses aqueous dispersions of vinyl ester polymers prepared in the presence of a stabilizing amount of polyvinyl alcohol having an average residual vinyl acetate content of 5 to 7 mole%. A single polyvinyl alcohol having this vinyl acetate content may be used or a combination of polyvinyl alcohols having average vinyl acetate contents of up to about 16 mole% may be blended to produce an average of 5 to 7 mole%. The resulting vinyl ester polymer dispersions are said to possess stability, both during and after preparation, water resistance of the adhesive after it has been deposited from the dispersion and a satisfactory viscosity index.

SUMMARY OF THE INVENTION

The present invention provides an aqueous dispersion of vinyl acetate/ethylene copolymers of 40 to 60 wt% solids which exhibit both fully-hydrolyzed polyvinyl alcohol combatibility and partially-hydrolyzed polyvinyl alcohol compatibility. The aqueous dispersion, or emulsion, comprises a vinyl acetate/ethylene copolymer dispersed in an aqueous medium which is prepared by the emulsion copolymerization of vinyl acetate and ethylene monomers in the presence of a stabilizing amount of a polyvinyl alcohol stabilizing system having an 8 to 10 mole% residual vinyl acetate content. The preferred polyvinyl alcohol system consists essentially of an intermediately-hydrolyzed polyvinyl alcohol having a 3 to 6 mole% vinyl acetate content and a partially-hydrolyzed polyvinyl alcohol having a 10 to 14 mole% vinyl acetate content. The intermediately-hydrolyzed polyvinyl alcohol and the partially-hydrolyzed polyvinyl alcohol are present in the mixture in a ratio that yields an average vinyl acetate content of about 8 to 10 mole%.

It is now possible for the adhesive industry to use one vinyl acetate/ethylene copolymer emulsion which can be safely blended with either a partially-or fully-hydrolyzed polyvinyl alcohol, or any polyvinyl alcohol which is about 75 to 99 mole% hydrolyzed, to afford adhesive compositions which do not physically separate on standing. Accordingly, another embodiment of the invention is an adhesive composition comprising an above-described vinyl acetate/ethylene copolymer emulsion and a partially-hydrolyzed polyvinyl alcohol or a fully-hydrolyzed polyvinyl alcohol.

As other advantages, the copolymer emulsions of the invention when blended with such post-added polyvinyl alcohol demonstrate a slower speed of set, i.e. a longer open time, and show enhanced plasticizer thickening allowing for increased viscosity using less plasticizer.

DETAILED DESCRIPTION OF THE INVENTION

Methods for preparing vinyl acetate/ethylene copolymer emulsions are well known in the art and any of the customary procedures can be used. The copolymers comprise 60 to 95 wt% vinyl acetate and 5 to 40 wt% ethylene, to provide a Tg ranging from about $-25°$ to $20°$ C., preferably 75 to 95 wt% vinyl acetate and 5 to 25 wt% ethylene, on a monomer basis, and may optionally include one or more additional ethylenically unsaturated copolymerizable monomers. Exemplary of such comonomers which may be present in up to 10 wt% are $C_3$–$C_{10}$ alkenoic acids, such as acryllic acid and methacrylic acid, and their esters with $C_1$–$C_{18}$ alkanols, such as methanol, ethanol, propanol, butanol and 2-ethylhexyl alcohol; alpha,beta-unsaturated $C_4$–$C_{10}$ alkenoic acids such as crotonic acid and isocrotonic acid and their esters with the same $C_1$–$C_{18}$ alkanols; vinyl halides such as vinyl chloride; alpha,beta-unsaturated $C_4$–$C_{10}$ alkenedioic acids such as maleic acid, fumaric acid and itaconic acid and their monoesters and diesters of the same $C_1$–$C_{18}$ alkanols; and nitrogen containing monoolefinically unsaturated monomers, particularly nitriles, amides, N-methylol amides, lower alkanoic acid esters of N-methylol amides, lower alkyl ethers of N-methylol amides and allylcarbamates, such as acrylonitrile, acrylamide, methacrylamide, N-methylolacrylamide, N-methylol methacrylamide, N-methylol allyl carbamate and N-methylol lower alkyl ethers or N-methylol lower alkanoic acid esters of N-methylolacrylamide, N-methylol methacrylamide and N-methylol allyl carbamate. If a comonomer is used, about 2–5 wt% is preferred.

Contemplated as the functional, or operative, equivalents of vinyl acetate in the copolymer emulsions are vinyl esters of $C_1$–$C_{18}$ alkanoic acids, such as vinyl formate, vinyl propionate, vinyl laurate and the like.

The polyvinyl alcohol stabilizing system having an 8 to 10 mole% residual vinyl acetate content which is used for the polymerization reaction to prepare the adhesive emulsion may comprise a single polyvinyl alcohol or a mixture of an intermediately-hydrolyzed polyvinyl alcohol having a 3 to 6 mole% residual vinyl acetate content, preferably 4 to 5 mole %, and a partially-hydrolyzed polyvinyl alcohol having a 10 to 14 mole% residual vinyl acetate content, preferably 12 to 13%. Since the degree of polymerization of the polyvinyl alcohols affects the viscosity of the emulsion product and is not critical to the invention, polyvinyl alcohols having a degree of polymerization ranging from 200 to 2000 are suitable for use in the invention.

The relative amount of each type of polyvinyl alcohol that is used in the stabilizing system is such that the stabilizing system has an average vinyl acetate content of 8 to 10 mole%, preferably 8 to 9 mole %. When the polyvinyl alcohol stabilizing system has an average vinyl acetate content of less than 8 mole%, for example 6–7 mole%, the copolymer emulsion shows a low plasticizer thickening. At an average vinyl acetate content of greater than about 10 mole%, compatibility with fully-hydrolyzed polyvinyl alcohol at room temperature is lost and the polyvinyl alcohol-emulsion mixture shows a lower plasticizer thickening and a faster speed of set. The preferred polyvinyl alcohol stabilizing system consists essentially of a 50:50 wt% mixture of a 95–96 mole % hydrolyzed polyvinyl alcohol (4 to 5 mole% vinyl acetate) and a 87–89 mole% hydrolyzed polyvinyl alcohol (11 to 13 mole% vinyl acetate).

The amounts of such polyvinyl alcohol stabilizing system used in the polymerization reaction is that amount typically added as the protective colloid in such vinyl acetate/ethylene copolymerization recipes, for example about 2 to 6% based on the weight of vinyl acetate. The polyvinyl alcohol is added to the polymerization reaction medium all at once prior to initiation or incrementally during the course of the polymerization, provided a sufficient amount is present initially to provide emulsion stability.

In addition to the polyvinyl alcohol stabilizing system, emulsifying agents and protective colloids well known in the polymerization art may also be added in low levels, for example to enhance stability. Suitable emulsifying agents would include polyoxyalkylene condensates; suitable protective colloids would include hydroxyalkyl celluloses.

Various free-radical forming sources can be used in carrying out the polymerization of the monomers, such as peroxide compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythrobic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythrobic acid; hydrogen peroxide, ammonium persulfate or potassium persulfate with sodium metabisulfite, sodium bisulfite, ferrous sulfate, zinc formaldehyde sulfoxylate or sodium formaldehyde sulfoxylate. Other free radical forming systems that are well known in the art can also be used to polymerize the monomers.

The oxidizing agent is generally employed in an amount of 0.01 to 1.0%, preferably 0.05 to 0.5 based on the weight of the vinyl acetate introduced into the polymerization system. The reducing agent is ordinarily added in an aqueous solution in the necessary equivalent amount.

In general, suitable vinyl acetate/ethylene copolymer emulsions can be prepared by the copolymerization of the monomers in the presence of the polyvinyl alcohol stabilizing system in an aqueous medium under pressures not exceeding about 100 atm and in the presence of a redox system which is added incrementally, the aqueous system being maintained by a suitable buffering agent at a pH of about 2 to 6. The process first involves a homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the redox system is added incrementally.

The reaction temperature can be controlled by the rate of redox addition and by the rate of heat dissipation. Generally, it is advantageous to maintain a mean temperature of about 50° C. during the polymerization of the monomers and to avoid temperature much in excess of 80° C. While temperatures as low as 0° can be used, economically the lower temperature limit is about 30° C.

The reaction time will depend upon variables such as the temperature, the free radical forming source and the desired extent of polymerization. It is generally desirable to continue with the reaction until less than 0.5% of the vinyl acetate remains unreacted.

In carrying out the polymerization, an amount of the vinyl acetate is initially charged to the polymerization vessel and saturated with ethylene. Most advantageously, at least about 10% of the total vinyl acetate to be polymerized is initially charged and the remainder of the vinyl acetate is added incrementally during the course of the polymerization. The charging of all the vinyl acetate initially is also contemplated with no additional incremental supply.

When reference is made to incremental addition, whether of vinyl acetate or redox system, substantially uniform additions, both with respect to quantity and time, are contemplated. Such additions are also referred to as "delay" additions.

The quantity of ethylene entering into the copolymer is influenced by the pressure, the agitation and the viscosity of the polymerization medium. Thus, to increase the ethylene content of the copolymer high pressures, greater agitation and a low viscosity are employed.

The process of forming the vinyl acetate/ethylene copolymer emulsion generally comprises the preparation of an aqueous solution containing the polyvinyl alcohol stabilizing system and, optionally, the pH buffering system. This aqueous solution and the initial or total charge of the vinyl acetate are added to the polymerization vessel and ethylene pressure is applied to the desired value. The pressurized ethylene source can be shut off from the reactor so that the ethylene pressure decays as it is polymerized or it can be kept open to maintain the ethylene pressure throughout the reaction, i.e. make-up ethylene. As previously mentioned, the mixture is thoroughly agitated to dissolve ethylene in the vinyl acetate and in the water phase. Conveniently, the charge is brought to polymerization temperature during this agitation period. The polymerization is then initiated by introducing initial amounts of either the oxidant or the reductant, the other having been added with the initial charge. After polymerization has started, the oxidant and reductant are incrementally added as required to continue polymerization. Any third copolymerizable monomer and the remaining vinyl acetate, if any, may be added as separate delays.

As mentioned, the reaction is generally continued until the residual vinyl acetate content is below about 0.5%. The completed reaction product is then allowed to cool to about room temperature while sealed from the atmosphere. The pH is then suitable adjusted to a value in the range of 4.5 to 7, preferably 4.5 to 5, to insure maximum stability.

Vinyl acetate/ethylene copolymer emulsions of relatively high solids contents can be directly produced having a solids content of 40 to 60%. They can, of course, be easily thinned by the addition of water to lower solids content of any desired value.

Another method for producing vinyl acetate/ethylene copolymer emulsions comprises first forming an aqueous emulsion of vinyl acetate and the polyvinyl alcohol stabilizing system in a reactor. The reactor is pressurized with ethylene to an ethylene-equilibrium pressure of about 200 to 500 psig. The resulting reaction mixture is adjusted to a temperature from about 10° to 30° C. Polymerization is initiated by the addition of a free radical source at a rate such that the reaction mixture is brought to a temperature of 45° to 85° C., preferably 65° to 75° C., within a period of 1 hour or less, preferably 30 minutes. The polymerization is continued as described previously until the vinyl acetate content is reduced below about 0.7 wt% of the copolymer.

This type of polymerization process is described in U.S. Pat. No. 4,332,850 which is incorporated by reference.

The vinyl acetate/ethylene copolymer emulsions of the invention are readily compatible with any polyvinyl alcohol which is about 75–99 mole% hydrolyzed, for example either fully-hydrolyzed polyvinyl alcohol (98 to 99 mole% hydrolyzed) or partially hydrolyzed polyvinyl alcohol (87 to 89 mole% hydrolyzed), and is post added to the emulsions to provide adhesive formulations. The emulsion and the polyvinyl alcohol are simply mixed together in the required amounts which in general involves adding up to about 50 wt% polyvinyl alcohol to the emulsion, based on solids. When the emulsions are blended with a fully hydrolyzed polyvinyl alcohol there is obtained a water resistant adhesive suitable for use in making cardboard and cigarettes. When blended with a partially-hydrolyzed polyvinyl alcohol an adhesive composition for envelopes is obtained.

The following examples are illustrative of the invention and are not intended to limit the scope thereof.

The vinyl acetate/ethylene copolymer emulsions produced in the following examples were evaluated for polyvinyl alcohol compatibility and plasticizer thickening by the following methods:

POLYVINYL ALCOHOL COMPATIBILITY

An equal weight of a 10% aqueous solution of a fully- or partially-hydrolyzed polyvinyl alcohol containing 0.2 parts per hundred Nopco JMY defoamer is added to about 175 to 200 g of emulsion. An additional 0.6 to 0.8 g of defoamer is then added to the mixture which is mixed at medium speed in a T-line laboratory mixer for about 20 to 25 minutes. The viscosity at 25° C. 20 rpm, #4 spindle RVF viscometer is checked after 16 to 20 hours and adjusted with water if necessary to a viscosity of 1,000±50 cp. The mixture is poured into two 100 ml graduated cylinders up to the 100 ml level with one cylinder then placed in an oven at 50° C. or 120° F. and the other cylinder kept at ambient conditions. The percent separation is recorded after every 24 hours for a period of 2 weeks for the mixture at elevated temperature and for 30 days for the mixture at ambient conditions.

PLASTICIZER/SOLVENT THICKENING

Plasticizer/Solvent (20 g), for example dibutylphthalate, is added to 200 g vinyl acetate/ethylene emulsion and mixed in a blender for 15 minutes. The sample is removed and stored at room temperature (for 20 to 24 hours). The viscosity is then measured at 25° C. 20 rpm (#6 or 7 spindle, Brookfield RVF-100 viscometer) and with regard to the following examples was reported as centipoises in Table 1.

EXAMPLE 1

In preparing the emulsion of Run 6, the following ingredients were mixed together until in solution:
10% aqueous solution Vinol ®425 PVOH[a] 285 g
10% aqueous solution Vinol ®523 PVOH[b] 285 g
Distilled water 555 g
Ferrous ammonium sulfate 0.05 g

[a] A 95.5 to 96.5 mole% hydrolyzed polyvinyl alcohol having a viscosity of 26–30 cps in a 4% aqueous solution at 20° C. marketed by Air Products and Chemicals, Inc.
[b] A 87 to 89 mole% hydrolyzed polyvinyl alcohol having a viscosity of 22–26 cps as a 4% aqueous solution at 20° C. marketed by Air Products and Chemicals, Inc.

The pH of the mixture was adjusted to 4.0±0.1 with acetic acid or 50/50 ammonium hydroxide/distilled water, if necessary.

A one gallon reactor was purged with nitrogen and the polyvinyl alcohol solution was then added. With the solution being agitated 200 rpm the vinyl acetate monomer (1428.0 g) was added. The reactor was purged twice with nitrogen (30 psi) followed by one ethylene purge (30 psi) over a 30-minute period at 24° C. The agitator speed was increased to 900 rpm and the reactor was pressurized to 280 psi with ethylene (subsurface). The reactor temperature and the ethylene pressure were allowed to equilibrate at 24° C. and 280 psig, respectively. The ethylene supply was shut off to the reactor.

A 10% aqueous zinc formaldehyde sulfoxylate solution (10 g) was added to the reactor at a rate of 2.0 cc/min and then stopped. The reaction was initiated using 0.4% aqueous hydrogen peroxide solution at a rate of 0.5 cc/min. After the reactor temperature increased 1° C. (initiation), the 10% zinc formaldehyde sulfoxylate solution was added at a rate of 0.2 cc/min while continuing the 0.4% hydrogen peroxide addition. The reaction temperature was ramped from 24° C. to 75° C. over a one hour period. The reaction temperature was maintained at 75° C. for the second and third hour of the reaction. At about 8% free vinyl acetate a switch was made from the 0.4% hydrogen peroxide solution to a 5% hydrogen peroxide solution at the same rate of addition. At this point the zinc formaldehyde sulfoxylate activated solution was ceased.

At about 0.5% or less vinyl acetate monomer, oxidant addition was stopped and the reaction mixture allowed to cool to 60° C. The reaction mixture was then transferred to a degasser to vent off any excess ethylene pressure. The following materials were then added to the degassing vessel:
Nopco JMY Defoamer 0.5 g in 5 g H$_2$O, then
t-butyl hydroperoxide 2.5 g
Sodium acetate 3.2 g
Sodium citrate 1.6 g, all in
Distilled water 20. g The contents is agitated in the degasser at 200 rpm and then filtered.

Runs 1–19 set forth in Table 1 were performed according to the above general procedure. Run 19 used a single polyvinyl alcohol having an 8 mole % vinyl acetate content.

TABLE 1

| RUN | WT % OF VINYL PVOH BASED ON VAc MONOMER (MOLE % RESIDUAL VINYL ACETATE) 425 (4) | 205 (12) | 523 (12) | 540 (12) | AVERAGE MOLE % RESIDUAL VINYL AC | VINOL-350[B] COMPATIBILITY % SEPARATION RT | 120° F. | VINOL-540[C] COMPATIBILITY % SEPARATION RT | 120° F. | PLASTICIZER THICKENING | SPEED OF SET |
|---|---|---|---|---|---|---|---|---|---|---|---|
| 1 | 3 | | | 1 | 6 | 0 | 1 | | | 8700 | |
| 2 | 3 | | 1 | | 6 | 0.5 | 1 | | | 3750 | 9-12 |
| 3 | 3 | | 1 | | 6 | — | 0.5 | — | 0 | 5000 | 12-15 |
| 4 | 2.4 | | 1.6 | | 7.2 | 0.5 | 1 | | | 8300 | 9-12 |
| 5 | 2 | | 2 | | 8 | 0.5 | 11 | | | 11500 | 9-12 |
| 6 | 2 | | 2 | | 8 | 0 | 8 | 0 | 0 | 14750 | 9-12 |
| 7 | 2 | | 2 | | 8 | 1 | 20 | | | 10000 | 9-12 |
| 8 | 2 | | 2 | | 8 | 8 | 14 | | | 11250 | 9-12 |
| 9 | 2 | | 2 | | 8 | 2 | 32 | | | 6000 | 12-15 |
| 10 | 2 | | 2 | | 8 | 0.5 | 2 | 0 | 0 | 12000 | 12-15 |
| 11 | 1.9 | | 2.1 | | 8.2 | 0 | 32 | | | 12000 | 12-15 |
| 12 | 1.8 | | 2.2 | | 8.4 | 0.5 | 1 | | | 11000 | 12-15 |
| 13 | 1.6 | | 2.4 | | 8.8 | 1 | 13 | | | 22000 | 12-15 |
| 14 | | 2 | 2 | | 12 | 29 | 32.5 | 0 | 0 | 10750 | 6-9 |
| 15 | | 2 | 2 | | 12 | 33 | — | 0 | 0 | 5000 | 6-9 |
| 16 | | 2 | 2 | | 12 | 31 | — | 0 | 0 | 2750 | 6-9 |
| 17[A] | 2 | | | 2 | 8 | 0 | 6 | | | 12750 | |
| 18[A] | 2 | | 2 | | 8 | 0 | 2 | | | 7250 | |
| 19 | 4 wt. % Gohsenol T-330 | | | | 8 | — | 1.0 | — | 0.5 | | |
| 20 | 2 | | 2 | 8 | 1.0 | 2.0 | 0 | 0 | | 6800 | 12-15 |
| 21 | 2 | | 2 | 8 | 0.5 | 0.5 | 0 | 0 | | 10500 | 12-15 |

[A] Reductant was erythorbic acid.
[B] "VINOL 350 is a PVOH having about 1.5 mole % residual vinyl acetate and a viscosity of 55–65 cps as a 4% aqueous solution at 20° C."
[C] "VINOL 540 is a PVOH having about 12 mole % residual vinyl acetate and a viscosity of 40–50 cps as a 4% aqueous solution at 20° C."

As can be seen from the data in Table 1 those vinyl acetate/ethylene copolymer emulsions prepared using a polyvinyl alcohol stabilizing system having a residual vinyl acetate content in the range of 8 to 10 mole% generally showed excellent partially- and fully-hydrolyzed to polyvinyl alcohol stability as well as a surprisingly very good plasticizer thickening and a slower speed of set.

EXAMPLE 2

For Runs 20 and 21, the procedure of Example 1 was followed except that the procedure was scaled up to use 1,000 pounds of each polyvinyl alcohol and proportionately increased amounts of the other ingredients. See Table 1 showing the polyvinyl alcohol compatibility of these Runs. Run 20 showed an unusually low plasticizer thickening for some unknown reason.

STATEMENT OF INDUSTRIAL APPLICATION

The invention provides vinyl acetate/ethylene copolymer emulsions which can be blended with polyvinyl alcohol to afford adhesive compositions.

We claim:

1. In a vinyl acetate/ethylene copolymer emulsion comprising an aqueous colloidal dispersion of a copolymer at 40 to 60 wt% solids and containing 60 to 95 wt% vinyl acetate and 5 to 40 wt% ethylene prepared by the emulsion polymerization of vinyl acetate and ethylene in the presence of a polyvinyl alcohol, the improvement for providing a vinyl acetate/ethylene copolymer emulsion that exhibits both partially- and fully-hydrolyzed polyvinyl alcohol compatibility and enhanced plasticizer thickening which comprises performing the copolymerization in the presence of a stabilizing amount of a polyvinyl alcohol stabilizing system consisting essentially of a polyvinyl alcohol having a 3 to 6 mole% vinyl acetate content and a polyvinyl alcohol having a 10 to 14 mole% vinyl acetate content in a ratio that yields about an 8 to 10 mole% average residual vinyl acetate content.

2. The emulsion of claim 1 in which the polyvinyl alcohol stabilizing system has an 8 to 9 mole% average vinyl acetate content.

3. The emulsion of claim 2 in which the polyvinyl alcohol stabilizing system comprises the two polyvinyl alcohols in a 50:50 weight ratio.

4. The emulsion of claim 1 in which the polyvinyl alcohol stabilizing system consists essentially of a polyvinyl alcohol having a 4 to 5 mole% vinyl acetate content and a polyvinyl alcohol having a 12 to 13 mole% vinyl acetate content in a ratio that yields an average vinyl acetate content of about 8 to 10 mole%.

5. The emulsion of claim 4 in which the polyvinyl alcohol stabilizing system consists essentially of the two polyvinyl alcohols in a 50:50 weight ratio.

6. An adhesive composition comprising the vinyl acetate/ethylene copolymer emulsion of claim 1 and, as a post-add to the emulsion, up to 50 wt%, based on emulsion solids, of a partially-hydrolyzed polyvinyl alcohol which is 87 to 89 mole% hydrolyzed.

7. An adhesive composition comprising the vinyl acetate/ethylene copolymer emulsion of claim 1 and, as a post-add to the emulsion, up to 50 wt%, based on emulsion solids, of a fully-hydrolyzed polyvinyl alcohol which is 98 to 99 mole% hydrolyzed.

8. An adhesive composition comprising the vinyl acetate/ethylene copolymer emulsion of claim 1 and, as a post-add to the emulsion, up to 50 wt%, based on emulsion solids, of a polyvinyl alcohol which is about 75 to 99 mole% hydrolyzed.

9. The emulsion of claim 1 in which the copolymer also contains up to 10 wt% of a comonomer which is a $C_3$–$C_{10}$ alkenoic acid or its ester with a $C_1$–$C_{18}$ alkanol, an alpha,beta-unsaturated $C_4$–$C_{10}$ alkenoic acid or its ester with a $C_1$–$C_{18}$ alkanol, a vinyl halide, an alpha,beta-unsaturated $C_4$–$C_{10}$ alkenedioic acid or its monoester or diester with a $C_1$–$C_{18}$ alkanol, or a nitrogen-containing monoolefinically unsaturated monomer which is a nitrile, an amide, an N-methylol amide, a lower alkanoic acid ester of an N-methylol amide, a lower alkyl ether of an N-methylol amide or allylcarbamate.

10. In a vinyl acetate/ethylene copolymer emulsion comprising an aqueous colloidal dispersion of a copolymer at about 40 to 60 wt% solids and containing 75 to 95 wt% vinyl acetate and 5 to 25 wt% ethylene prepared by the emulsion polymerization of the vinyl acetate and ethylene in the presence of a polyvinyl alcohol, the improvement for providing a vinyl acetate/ethylene copolymer emulsion that exhibits both partially- and fully-hydrolyzed polyvinyl alcohol compatibility and enhanced plasticizer thickening, which comprises performing the copolymerization in the presence of a stabilizing amount of a polyvinyl alcohol stabilizing system consisting essentially of a polyvinyl alcohol having a 3 to 6 mole% vinyl acetate content and a polyvinyl alcohol having a 10 to 14 mole% vinyl acetate content in a ratio that yields about an 8 to 9 mole% average vinyl acetate content.

11. The emulsion of claim 10 in which the polyvinyl alcohol stabilizing system consists essentially of the two polyvinyl alcohols in a 50:50 weight ratio.

12. The emulsion of claim 10 in which the polyvinyl alcohol stabilizing system consists essentially of a polyvinyl alcohol having a 4 to 5 mole% vinyl acetate content and a polyvinyl alcohol having a 12 to 13 mole% vinyl acetate content in a ratio that yields an average vinyl acetate content of about 8 to 9 mole%.

13. The emulsion of claim 12 in which the polyvinyl alcohol stabilizing system consists essentially of the two polyvinyl alcohols in a 50:50 weight ratio.

* * * * *